(12) United States Patent
Gajowniczek et al.

(10) Patent No.: US 11,674,414 B2
(45) Date of Patent: Jun. 13, 2023

(54) GAS TURBINE ENGINE AND MOUNT ASSEMBLY THEREFOR

(71) Applicant: PRATT & WHITNEY CANADA CORP., Longueuil (CA)

(72) Inventors: Krzysztof Gajowniczek, Longueuil (CA); Paul Weaver, Longueuil (CA); Melanie Brillant, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/206,887

(22) Filed: Mar. 19, 2021

(65) Prior Publication Data

US 2022/0298930 A1 Sep. 22, 2022

(51) Int. Cl.
*F01D 25/28* (2006.01)
*F01D 25/24* (2006.01)
*B64D 27/26* (2006.01)

(52) U.S. Cl.
CPC .......... *F01D 25/243* (2013.01); *B64D 27/26* (2013.01); *F01D 25/285* (2013.01); *B64D 2027/262* (2013.01); *B64D 2027/264* (2013.01); *B64D 2027/266* (2013.01); *B64D 2027/268* (2013.01); *F05D 2220/32* (2013.01); *F05D 2240/90* (2013.01)

(58) Field of Classification Search
CPC .............. B64D 27/26; B64D 2027/262; B64D 2027/264; B64D 2027/266; B64D 2027/268; F01D 25/285; F05D 2220/32; F05D 2240/90
See application file for complete search history.

(56) References Cited

U.S. PATENT DOCUMENTS 2,951,395 A 9/1960 Smith
2,978,869 A 4/1961 Hiscock
(Continued)

FOREIGN PATENT DOCUMENTS

WO 2014011982 1/2014

OTHER PUBLICATIONS

William Sheridan and Kazem Kazerounian, "Design Optimization Study of Isolation Mount Systems for Gas Turbine Engine Accessories," GT2005-68048, ASME Turbo Expo 2005: Power for Land, Sea and Air Jun. 6-9, 2005. (Year: 2005).

*Primary Examiner* — Igor Kershteyn
*Assistant Examiner* — Theodore C Ribadeneyra
(74) *Attorney, Agent, or Firm* — Norton Rose Fulbright Canada LLP

(57) ABSTRACT

The gas turbine engine can have a casing, a rotor rotatable around a rotation axis relative the casing, the casing extending along and around the rotation axis, a first component mounted externally to the casing by a first mount, the first mount defining a torsion axis extending along a vertical radial orientation normal the rotation axis, the first component having a center of gravity located on a first side relative the torsion axis, a second component mounted externally to the casing on the second side, extending along the vertical radial orientation from a bottom portion to a top portion, a second mount structurally connecting the bottom portion to the casing, and a structure connecting the top portion to the first component on the second side relative the torsion axis.

13 Claims, 7 Drawing Sheets

(56) References Cited

U.S. PATENT DOCUMENTS

| | | | |
|---|---|---|---|
| 3,027,971 A * | 4/1962 | Ketler, Jr. | F01D 25/18 184/6.13 |
| 3,155,352 A | 11/1964 | Batt | |
| 3,543,588 A | 12/1970 | Richardson et al. | |
| 3,771,287 A * | 11/1973 | Sunderland | F02C 7/00 96/219 |
| 4,742,975 A * | 5/1988 | Pachomoff | B64D 27/26 244/54 |
| 4,991,431 A * | 2/1991 | Gaither | G01L 5/133 73/112.01 |
| 5,127,607 A * | 7/1992 | McGuire | F16F 13/26 244/54 |
| 5,435,124 A * | 7/1995 | Sadil | F01D 25/285 248/220.21 |
| 5,918,833 A * | 7/1999 | Najand | F16F 13/26 248/556 |
| 6,126,110 A * | 10/2000 | Seaquist | B64D 27/18 244/54 |
| 6,260,351 B1 | 7/2001 | Delano et al. | |
| 6,357,220 B1 * | 3/2002 | Snyder | F02C 7/32 60/226.1 |
| 6,474,596 B1 * | 11/2002 | Cousin | B64D 27/26 244/54 |
| 7,159,819 B2 * | 1/2007 | Machado | B64D 27/26 244/54 |
| 7,971,825 B2 * | 7/2011 | Diochon | B64D 27/18 244/54 |
| 8,226,028 B2 * | 7/2012 | Marche | B64D 27/12 244/54 |
| 8,474,751 B2 * | 7/2013 | Lebas | B64D 27/12 244/54 |
| 9,032,740 B2 * | 5/2015 | Journade | F01D 25/28 60/797 |
| 9,238,511 B2 * | 1/2016 | Woolley | B64D 27/12 |
| 9,500,133 B2 | 11/2016 | Davis et al. | |
| 9,863,324 B2 | 1/2018 | Leonard et al. | |
| 9,951,655 B2 | 4/2018 | Davis et al. | |
| 10,012,149 B2 | 7/2018 | Jiang et al. | |
| 10,054,001 B2 | 8/2018 | Beutin et al. | |
| 10,144,526 B2 * | 12/2018 | Zameroski | G06F 11/3447 |
| 10,914,198 B2 * | 2/2021 | Cleyet | F01D 25/18 |
| 10,974,837 B2 * | 4/2021 | Nicq | F02C 7/36 |
| 2005/0116093 A1 * | 6/2005 | Machado | B64D 27/12 244/54 |
| 2007/0125087 A1 * | 6/2007 | Callaghan | F02C 7/32 60/772 |
| 2009/0056078 A1 * | 3/2009 | Njaastad | H04N 1/00519 16/382 |
| 2010/0176239 A1 * | 7/2010 | Marche | B64D 27/12 244/54 |
| 2011/0239660 A1 * | 10/2011 | Suciu | F01D 15/12 60/784 |
| 2012/0304811 A1 | 12/2012 | Niggemeier et al. | |
| 2013/0042630 A1 * | 2/2013 | Muldoon | F02C 7/32 60/796 |
| 2016/0017811 A1 | 1/2016 | Martin et al. | |
| 2016/0280381 A1 * | 9/2016 | Zameroski | F01D 25/04 |
| 2017/0260908 A1 | 9/2017 | Jiang et al. | |
| 2018/0023408 A1 | 1/2018 | Rice et al. | |
| 2018/0104893 A1 * | 4/2018 | Bougelet | B22F 5/10 |
| 2019/0009918 A1 * | 1/2019 | Zameroski | B64D 27/26 |
| 2019/0084134 A1 | 3/2019 | Abbott | |

* cited by examiner

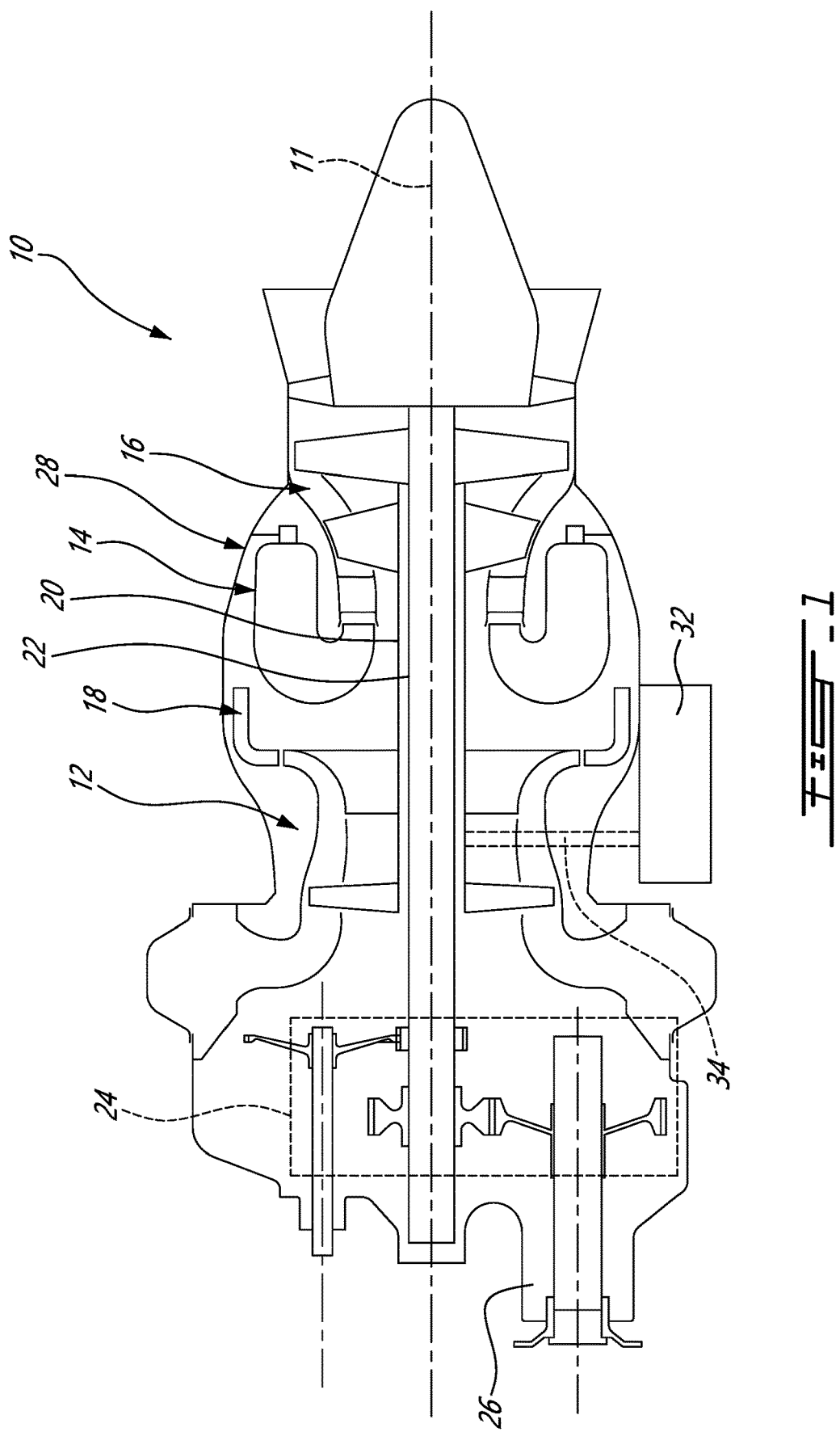

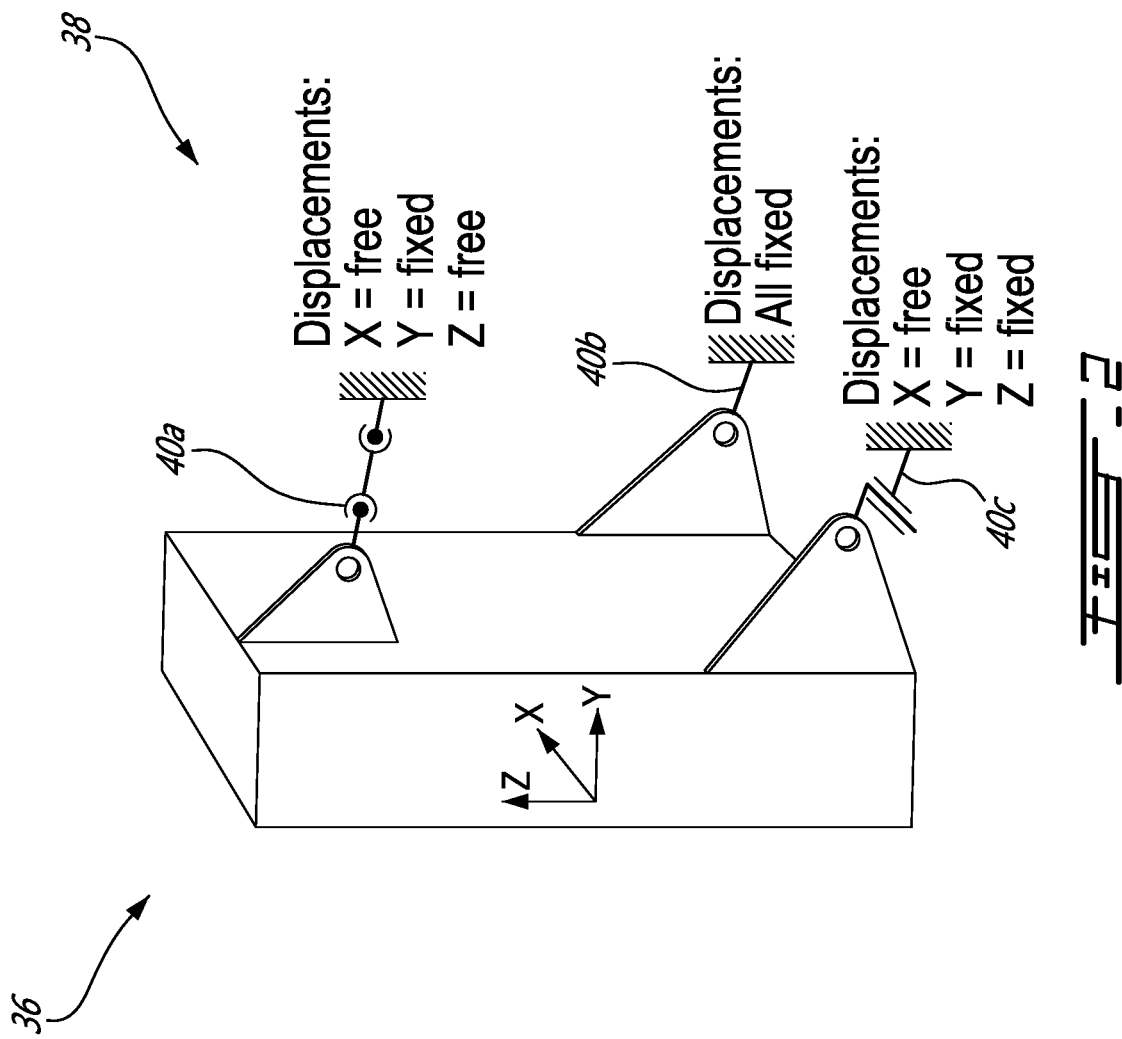

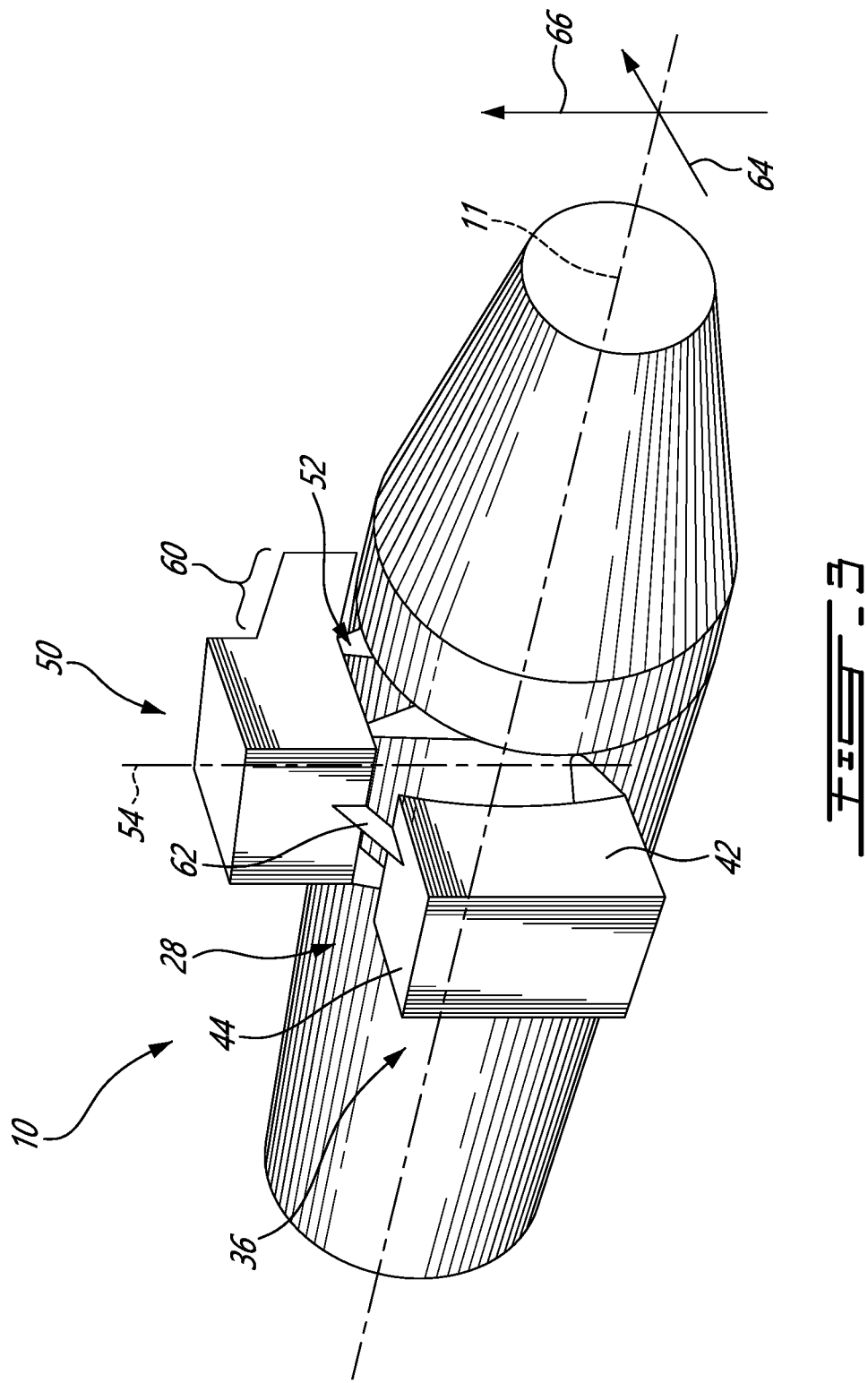

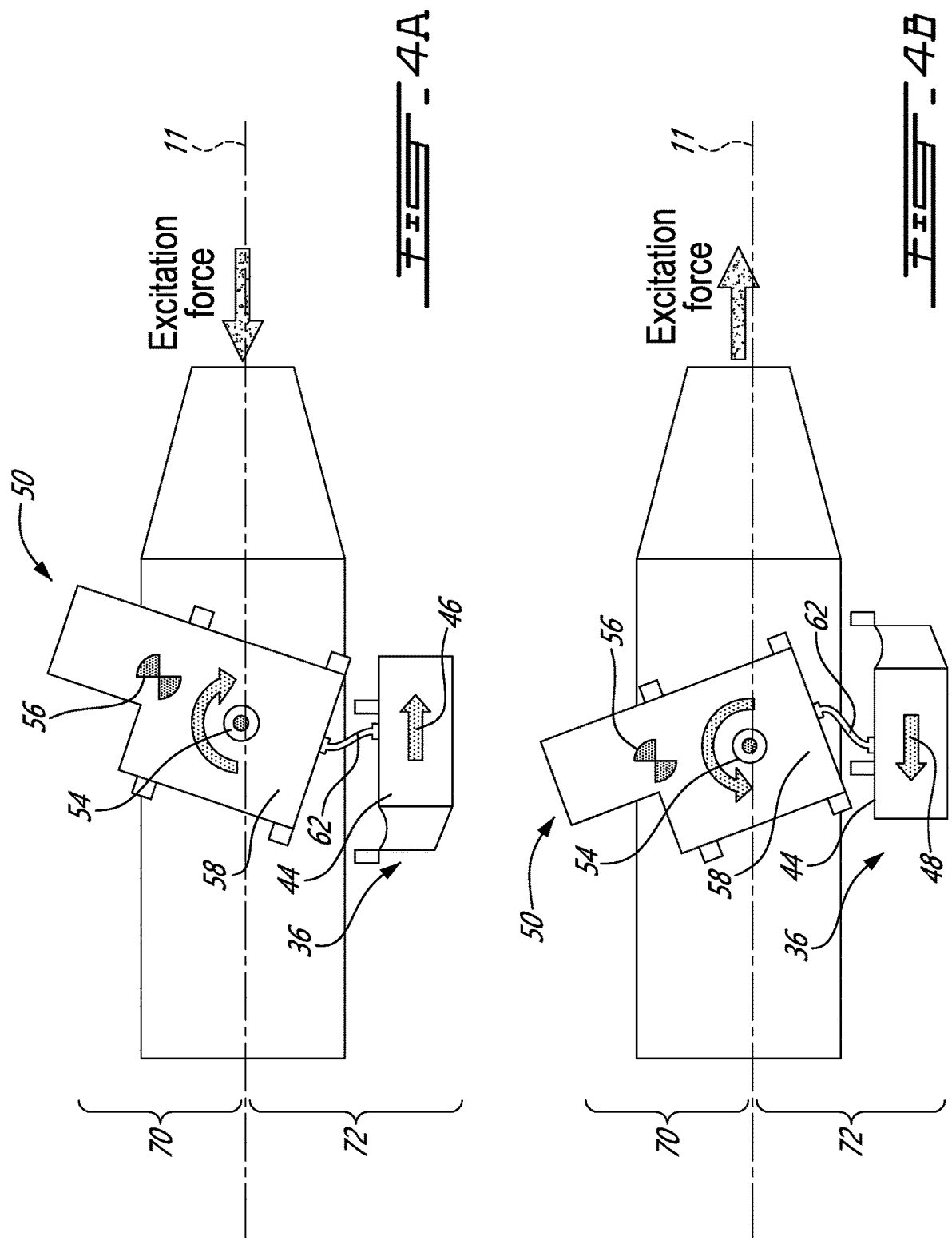

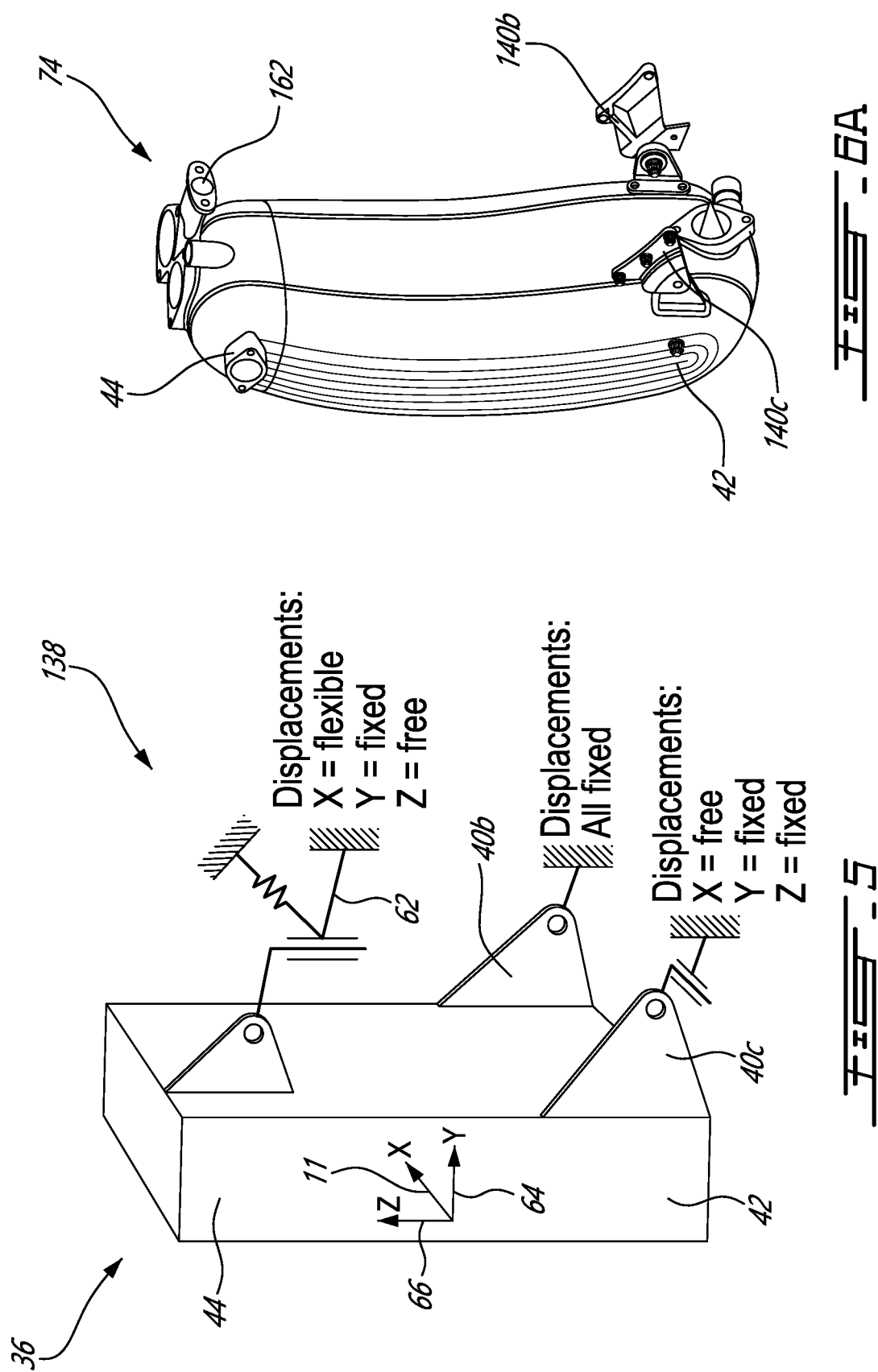

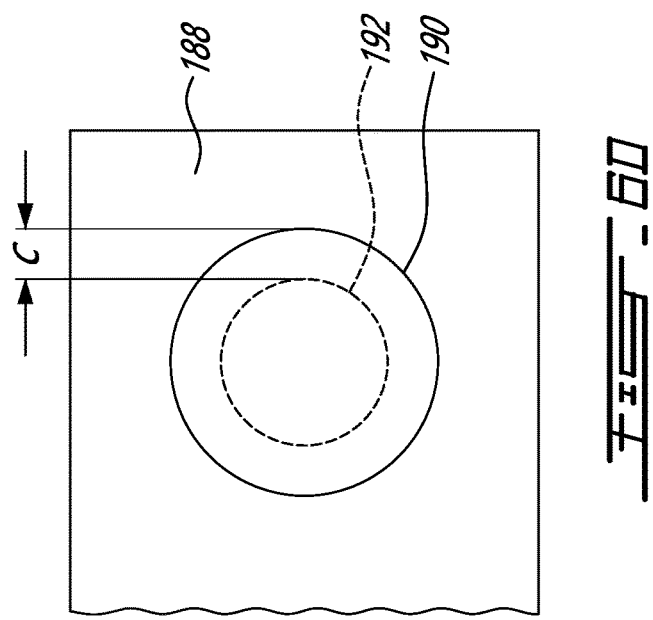
FIG. 6D
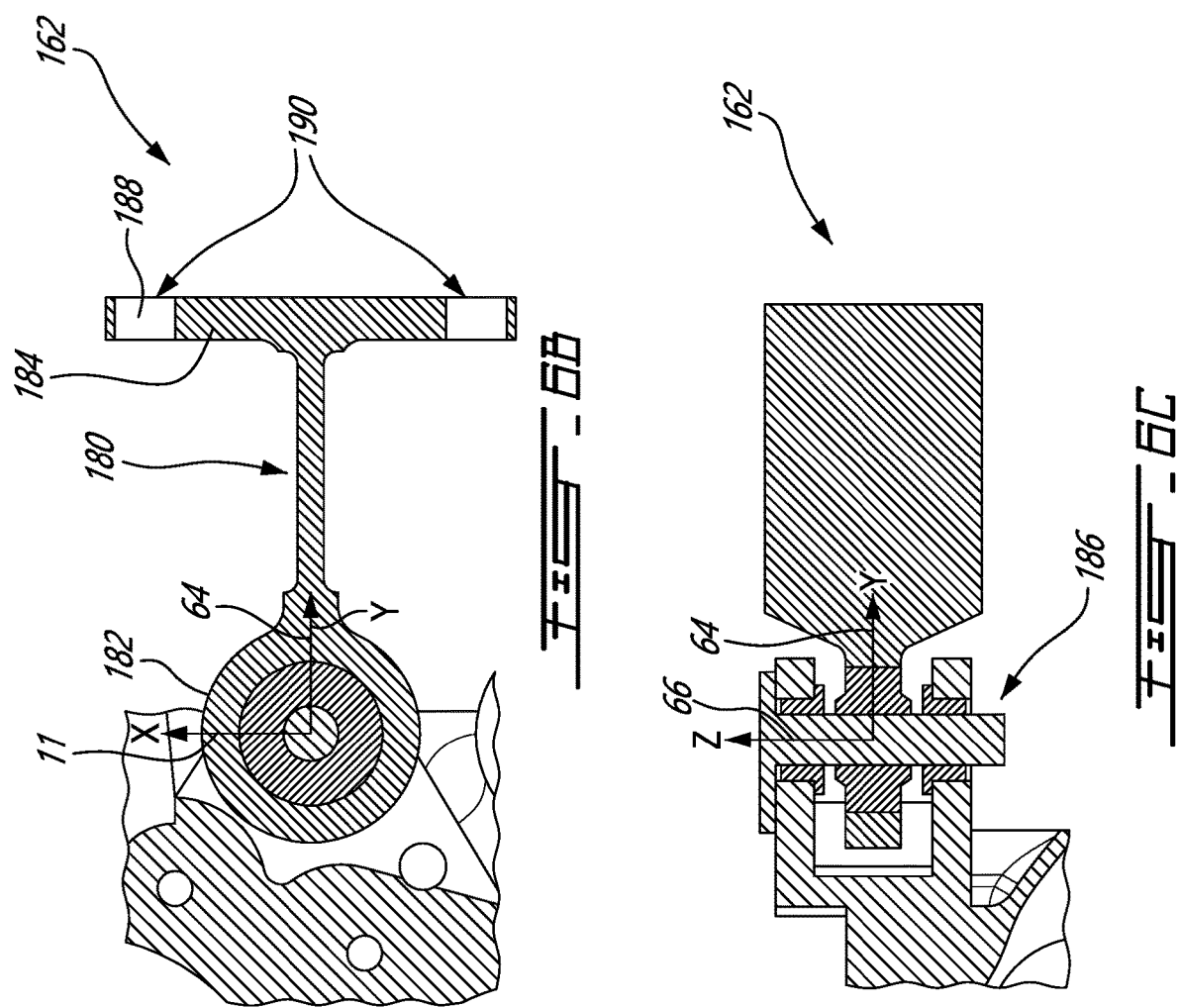
FIG. 6B
FIG. 6C

```
┌─────────────────────────────┐
│ Generating axial vibrations │──200
│      along the axis         │
└─────────────────────────────┘
              │
     ┌────────┴────────┐
     │                 │
┌─────────────────┐  ┌─────────────────┐
│ Entraining a    │  │ Entraining an   │
│ torsional       │  │ axial vibration │
│ vibration mode  │──│ mode in a       │──220
│ in a first      │210│ portion of a   │
│ component       │  │ second component│
│ mounted         │  │ mounted         │
│ externally to   │  │ externally to   │
│ the casing,     │  │ the casing, said│
│ said torsional  │  │ portion of the  │
│ vibration mode  │  │ second component│
│ being defined   │  │ extending       │
│ around a torsion│  │ adjacent a side │
│ axis normal to  │  │ of the first    │
│ the rotor axis, │  │ component,      │
│ said torsional  │  └─────────────────┘
│ vibration mode  │
│ entraining an   │
│ axial movement  │
│ of the side of  │
│ the first       │
│ component       │
│ opposite an     │
│ axial movement  │
│ of the portion  │
│ of the second   │
│ component       │
│ entrained by the│
│ axial vibration │
│ mode            │
└─────────────────┘
              │
┌─────────────────────────────┐
│ Transferring energy from the│
│ torsional vibration mode to │──230
│ oppose energy from the axial│
│ vibration mode via a bracket│
│ connecting the portion of   │
│ the second component to the │
│ side of the first component │
└─────────────────────────────┘
```

GAS TURBINE ENGINE AND MOUNT ASSEMBLY THEREFOR

TECHNICAL FIELD

The application relates generally to gas turbine engines and, more particularly, to mount configurations therefore.

BACKGROUND OF THE ART

It is relatively common for gas turbine engines to have one or more relatively large and heavy components secured externally to the casing. The nature of such components varies from one engine model to another, and can include an accessory gearbox (AGB), an oil tank, a starter/generator, an electronics housing, and an oil cooler to name a few examples. Various motivations may exist for mounting such a component externally to the casing, remotely from the engine's main rotation axis, such as seeking an environment which is cooler than the engine core, for instance, or connection convenience with another component. In some engine designs, it can be considered non-feasible to mount such components rigidly to the casing, and this can be due, for instance, to the requirement of allowing for different degrees of thermal expansion between the component and the casing, which can be particularly true for larger components. Accordingly, mounts, typically consisting of a number of discrete structures, are used between the component and the casing. Such structures can allow for varying degrees of freedom of movement of their attachment point on the component and the casing. Design consideration in mount configurations include the weight and static structural resistance of the mount, allowance for varying degrees of relative thermal expansion over the operating envelope. While existing mounts were satisfactory to a certain degree there remained room for improvement, particularly in terms of taking into consideration dynamic effects such as vibrational resonance.

SUMMARY

In one aspect, there is provided a gas turbine engine comprising: a casing, a rotor rotatable around a rotation axis relative the casing, the casing extending along and around the rotation axis, an axial orientation defined parallel to the rotation axis, a vertical radial orientation defined normal to the axial orientation, the vertical radial orientation extending from a bottom to a top, and a horizontal radial orientation defined normal to both the axial orientation and to the vertical radial orientation, the horizontal radial orientation extending from a first side to a second side; a first component mounted externally to the casing by a first mount, the first mount defining a torsion axis extending along the vertical radial orientation, the first component having a center of gravity located on the first side relative the torsion axis; a second component mounted externally to the casing on the second side, extending along the vertical radial orientation from a bottom portion to a top portion, a second mount structurally connecting the bottom portion to the casing; and a structure connecting the top portion to the first component on the second side relative the torsion axis.

In another aspect, there is provided a method of operating a gas turbine engine having a rotor rotating within a casing around a rotation axis, the method comprising: generating axial vibrations along the rotation axis, said axial vibrations i) entraining a torsional vibration mode in a first component mounted externally to the casing, said torsional vibration mode being defined around a torsion axis normal to the rotation axis, and ii) entraining an axial vibration mode in a portion of a second component mounted externally to the casing, said portion of the second component extending adjacent a side of the first component, said torsional vibration mode entraining an axial movement of the side of the first component opposite an axial movement of the portion of the second component entrained by the axial vibration mode; and transferring energy from the torsional vibration mode to oppose energy from the axial vibration mode via a structure connecting the portion of the second component to the side of the first component.

In a further aspect, there is provided an assembly comprising: a first component mounted externally to a supporting component by a first mount, the first mount defining a torsion axis, the first component having a center of gravity located on a first side relative the torsion axis; a second component mounted to the supporting component on a second side; and a structure connecting the second component to the first component on the second side relative the torsion axis.

DESCRIPTION OF THE DRAWINGS

Reference is now made to the accompanying figures in which:

FIG. 1 is a schematic cross-sectional view of a gas turbine engine;

FIG. 2 is a first example of a mount configuration;

FIG. 3 is an oblique schematic view of the gas turbine engine;

FIG. 4A and FIG. 4B are top schematic views of the gas turbine engine;

FIG. 5 is a second example of a mount configuration;

FIG. 6a is an example of an oil tank with a corresponding mount, FIGS. 6B, 6C and 6D being enlarged portions thereof taken from different angles; and FIG. 7 is a flowchart of an example method of operating a gas turbine engine.

DETAILED DESCRIPTION

FIG. 1 illustrates an example of a turbine engine. In this example, the turbine engine 10 is a turboshaft engine generally comprising in serial flow communication, a multistage compressor 12 for pressurizing the air, a combustor 14 in which the compressed air is mixed with fuel and ignited for generating an annular stream of hot combustion gases around the engine rotation axis 11, and a turbine section 16 for extracting energy from the combustion gases. The turbine engine terminates in an exhaust section.

The fluid path extending sequentially across the compressor 12, the combustor 14 and the turbine 16 can be referred to as the core gas path 18. In practice, the combustor 14 can include a plurality of identical, circumferentially interspaced, combustor units. The exact design varies from one engine type to another, but it is common for turboshaft engines, for instance, to have two rotors, including one high pressure shaft 20, connecting a high pressure turbine section to the compressor 14, and a low pressure shaft 22, sometimes referred to as a power shaft, which is used as a power source during use. Turbofan, electric, and hybrid aircraft engines can also have one or more shaft associated to corresponding rotors.

Turboshaft engines, similarly to turboprop engines, typically have some form of gearing by which the power of the low pressure shaft 22 is transferred to an external shaft 26 bearing the blades (or propeller). This gearing, which can be referred to as a gearbox 24 for the sake of simplicity, typically reduces the rotation speed to reach an external rotation speed which is better adapted to rotate the blades or propeller for instance.

Aircraft engines have casings which can include a plurality of non-rotary components assembled to one another, and the exact design thereof can vary from one aircraft engine type to another. In the case of gas turbine engines or hybrid engines, the casing 28 typically has a radially-inner wall, relative the rotation axis 11, forming a radially outer delimitation to the core gas path 18, and can also have a radially outer wall 28. The casing 28 can be housed within a nacelle having an aerodynamic configuration, or otherwise within the aerodynamic external skin of the aircraft.

Aircraft engines typically have an accessory gearbox (AGB) 32 which can serve for exchanging power from the aircraft engine's core and "accessories". Accessory gearboxes 32 typically provide for the connection to more than one accessory. The exact selection of accessories can vary from one engine to another, but it is relatively common for the accessories to include one or more fuel pump, oil pump, engine starter, etc. The accessory gearbox 32 can be located externally to the casing 28, and somewhat remotely from the engine's core to avoid the harsh temperatures which can be sustained during operation of the higher pressure compressors, combustor 16, and turbine sections 18. The accessory gearbox 32 can be connected to transfer power to an engine shaft (e.g. shaft 20) by a radially-extending driveshaft 34.

Given the presence of internal gearing, and especially in the case of AGB's having multiple ports, AGBs 32 can be relatively heavy components. Their placement, especially when remote to the engine's rotation axis 11, can make them prone to dynamic effects, such as resonant vibration frequency response, in addition to more typical structural considerations. This can also be true for other relatively large and heavy components secured externally to the casing, such as an oil tank, a starter/generator, an electronics housing, and an oil cooler, to name a few examples.

Various motivations may exist for mounting such relatively large and heavy components 36 externally to the casing 28, remotely from the engine's rotation axis 11, such as seeking an environment which is cooler than the engine core, for instance, or connection convenience with another component. In some engine designs, it can be considered non-feasible to mount such components 36 rigidly to the casing 28, and this can be due, for instance, to the requirement of allowing for different degrees of thermal expansion between the component 36 and the casing 28, which can be particularly true for larger components. Accordingly, mounts 38, typically consisting of a number of discrete structures 40*a*, 40*b*, 40*c*, can be used between the component 36 and the casing 28. Such structures 40*a*, 40*b*, 40*c* can allow for varying degrees of freedom of displacement at their attachment point on the component 36 or the casing 28. Design consideration in mount configurations include the weight and static structural resistance of the mount, allowance for varying degrees of relative thermal expansion over the operating envelope. The structures 40*a*, 40*b*, 40*c* can be brackets, for instance.

An example mount configuration which can be used to mount a relatively large and heavy component 36 externally to a casing 28 of an engine 10 is presented in FIG. 2. In this example, the mount 38 has three structures 40*a*, 40*b*, 40*c* and is arranged in a so-called 3-2-1 configuration. More specifically, a first structure 40*b* is fixed in displacement in 3 orthogonal orientations, a second structure 40*c* is fixed in displacement in 2 orthogonal orientations, and free to displacement in the third orthogonal orientation to accommodate, say, thermal expansion in that orientation relative the first structure 40*b*, and a third structure 40*a* fixed in 1 orthogonal orientation, and free to displacement in the second and third orthogonal orientations. The second structure 40*c* can have a sliding engagement in the third orthogonal orientation, and the third structure 40*a* can have a double spherical joint allowing movement in the second and third orthogonal orientations, for instance. Such a mount configuration can allow mounting a relatively large and heavy component externally to the casing in a relatively low weight manner, and can be suitable to a certain degree in many embodiments. However, it may not be suitable for all embodiments.

In particular, if the component 36 in question is relatively long/tall in an orientation normal to a major vibration orientation, one of its ends, typically the one associated with the structure 40*a* offering the greatest degree of freedom, may be prone to resonant vibration due to the alternating excitation forces operating in the major vibration orientation, and it may be challenging or impossible to limit the amplitude of the resonant vibration of that end within a specified range without an unsatisfactory penalty in terms of weight.

Such a scenario can occur, for instance, in a context such as presented in FIG. 3 where a tall component 36, such as an oil tank, starter/generator, electronics housing, or oil cooler to name a few examples, is mounted externally to a casing 28 in a manner that its height extends normal to the engine's rotation axis 11, and where the engine 10 has a strong excitation vibration in the orientation of its rotation axis 11, which may particularly be the case in many turboshaft engines which rotate helicopter blades. Indeed, the helicopter blades can be a significant source of "chucking" vibration. The chucking load can be transferred to the engine through a front mount of the engine (not shown), which is attached to the case 28, and the load can therefore be carried by the case 28, which can translate in strong vibrations in the orientation of the rotation axis 11. In a context where a 3 structure 40*b* and a 2 structure 40*c* are used to support the bottom 42 of such a tall component 36 onto the casing 28, and where a 1 structure 40*a* is used to support the top 44 of such a tall component 36, the top 44 of the component 36 can experience vibration in the form of alternating forward 46 and backward 48 movement parallel to the rotation axis 11, such as schematized in FIGS. 4A and 4B, for instance.

For convenience, a first side 70 and a second side 72 can be defined relative the torsion axis 54, in opposite directions along the horizontal radial orientation 64.

In the scenario presented in FIG. 3, another relatively large and heavy component 50 is mounted to the engine casing 28, circumferentially adjacent the first component 36. This second component 50 is mounted to the engine 10 here with a corresponding mount 52, which can include a plurality of structures, such as three or four, for instance, and the mount 52 is subject to torsion around a torsion axis 54 oriented parallel to a height of the first component 36. In this scenario, the second component 50 has a center of gravity 56 which is offset from the torsion axis 54, as perhaps best seen in FIGS. 4A and 4B, such that the axial vibration generates alternating forward and backward movement on the center of gravity 56, and the center of gravity 56 being laterally offset from the torsion axis 54, the forward and backward movement translates into a moment around the torsion axis 54, and thereby torsion around the torsion axis 54. The torsion movement leads to an opposite forward and backward movement on the other side 58 of the second component 50. This scenario can occur when the second component 50 is an AGB 32 for instance which has an relatively heavy overhang 60 protruding laterally on a side opposite the first component 36, for instance, relative to the torsion axis 54 of the mount 52. The overhang 60 can be considered relatively heavy when it laterally offsets the center of gravity by more than 3%, more than 8%, or more than 15% of the width of the second component 50, for instance, depending on the embodiment. In such as case, the torsion axis 54 can coincide with the rotation axis of the driveshaft 34, for instance, and the overhang 60 can house a relatively heavy bearing oil pump for instance. It will be noted here that in this scenario, the side 58 of the second component 50 and the top 44 of the first component 36 experience alternating axial movements in opposite directions, at the same frequency. As will now be detailed, this phenomena can be harnessed to dynamically stiffen the overall assembly.

More specifically, a structure 62 can be used to connect the top 44 of the first component 36 to the adjacent side 58 of the second component 50 in a manner to stiffen the overall assembly via axially oriented flexing stresses occurring in the structure 62 and communicated between the two components via the structure. The connection between the structure 62 and the side 58 of the second component can be made by directly, such as by connecting the structure 62 to a point or area forming part of the second component 50 itself (e.g. a housing of the second component 50), or indirectly, by connecting the structure to a point or area of an adjacent component which moves dynamically together with the second component 50. In particular, the mount 52 by which the second component 50 is mounted to the casing can by dynamically integral with the second component 50, and move with it, especially the portions of the mount 52 which are the closest to the second component 50. Accordingly, the structure 62 can be connected to the second component 50 indirectly, via a corresponding portion of its mount 52.

It is not necessary for the structure 62 to be stiff in the axial orientation, and in fact, in some embodiments, it can be preferred for the structure to exhibit some degree flexibility in the axial orientation. More specifically, the structure 62 can be stiff in the horizontal radial orientation 64, free in the vertical radial orientation 66, and flexible in the axial orientation 11. More specifically, in the horizontal radial orientation 64, the bracket can be pushed or pulled, which leads to compression or tension in the bracket instead of bending. The flexibility in the axial orientation 11 is designed in a manner to lead to bending within the elastic domain. The structure 62 can be designed in a manner to exhibit a lower degree of bending, or no bending at all, from stress exhibited in the width orientation. Depending of the embodiment, the structure can have a length extending mainly in the width orientation, or mainly in the height orientation, as both cases can be designed in a manner to exhibit flexibility in the axial orientation, rigidity in the horizontal radial orientation, and freedom of movement in the vertical radial orientation, for instance. The degree of flexibility can be tuned via the choice of material and shape/configuration, and the dimensions, particularly in the axial orientation 11. More specifically, the spring rate of the structure 62 can be adjusted by changing the length, thickness, height and material type, which in turn can adjust the system dynamic response. More precisely, the stiffness of the structure 62 can be tuned precisely to couple the torsional mode of the second component 50 to the axial mode of the first component 36. To achieve this, the modes can be simulated and observed using computer assisted modelization using the components 36, 50 individually mounted with respective mounts 52, 38, but without the interconnecting structure 62. The presence of the structure 62 can increase the natural frequency of the components to a much higher frequency for a same mounting stiffness.

The mounting configuration for the component 36 can be as schematized in FIG. 5. For ease of reference, three orthogonal orientations can be defined as the axial orientation 11, the horizontal radial orientation 64, and the vertical radial orientation 66, but it will be understood that these expressions are attributed arbitrarily and imply no particular reference to the orientation of the gas turbine engine relative to the ground, or relative to the aircraft. In alternate embodiments, for instance, the two components 36, 50 can be in different relative orientations relative the main orientation of vibration, the torsion axis can be defined as being normal to the main orientation of vibration, for instance. Similarly, the relative position and orientation of the components can be alternately presented in a frame of reference of the torsion axis 54 instead of the frame of reference of the engine rotation axis 11, for instance. We will continue the explanation on the basis of the three orthogonal orientations as defined previously for simplicity and convenience. Here, the second mount 138 includes a 2 structure 40c and a 3 structure 40b securing a bottom 42 of the component 36 to the casing 28, as in the mount 38. However, a different structure 62 is used to secure the top 44 of the component 36 to the second component 50. The structure 62 still fixes displacement in the horizontal radial orientation 64 and is still free to displacement along the vertical radial orientation 66, but is elastically flexible in the axial orientation 11, and thus offers only a partial resistance to displacement along the axial orientation 11.

FIG. 6A shows one possible example embodiment of a component 36, more precisely an oil tank 74. Indeed, it is common in gas turbine engines to make the oil tank 74 tall in a manner to stabilize the level of oil within the tank 74, and given the tallness, and weight of that component, and the context of a helicopter, the oil tank 74 can be particularly sensitive to axially oriented resonant frequency modes in the top portion 44 thereof. The tank can be outfitted with a 2-structure 140c and a 3-structure 140b at the bottom thereof, which directly connect to the engine casing. Another structure 162 can be used to connect the top 44 directly to the AGB's housing laterally opposite the overhang portion.

FIGS. 6B and 6C are top and transverse cross-section views, respectively, showing the example structure 162 in further detail. The structure 162 can include a beam 180 extending between a first end 182 connecting the tank, and a second end 184 connecting the AGB 32. The beam 180 can be taller in the vertical radial orientation 66 than thick in the axial orientation 11, to be elastically bendable in the axial orientation 11. In other words, it can be more elastically flexible in the axial orientation 11 than in the horizontal radial orientation 64, where it is fixed. It can be at least three times narrower in the axial orientation 11 than in the vertical radial orientation 66, and in this specific embodiment, it is roughly 10 times narrower in the axial orientation 11 than in the vertical radial orientation 66. One of the two ends, the one 182 connecting the tank 74 in this embodiment, can have a sliding mount 186 providing sliding-ability, and thus a degree of freedom, along the vertical radial orientation 66. One of the two ends, or both, and more specifically the end 184 connecting the AGB 32 housing in this embodiment, can be provided with one or more flanges 188 having one or more clearance holes 190 through which one or more fasteners 190 are to be introduced to secure the end 184 to the component. As perhaps best seen in FIG. 6D, clearance holes 190 have a cross-sectional shape which is larger than a cross section of the corresponding fastener 192, leaving a clearance c, such that the two components can remain loosely connected to accommodate assembly tolerance stackups, until the final assembly step where the fastener sandwiches the flange between a head or nut and a corresponding surface of the component. The use of clearance holes can avoid pre-stressing the structure 162 during assembly.

In accordance with one embodiment, the following process can occur during the operation of the gas turbine engine. Generating axial vibrations along the axis 200, these axial vibrations can be generated, for instance, by the rotation of helicopter blades as a function of the speed of rotation and of the number of blades during operating conditions such as cruising. The axial vibrations then entrain two effects simultaneously: a torsional vibration mode 210 in a first component mounted externally to the casing, the torsional vibration mode 210 being defined around a torsion axis normal to the rotation axis, and an axial vibration mode 220 in a portion of a second component mounted externally to the casing, the portion of the second component extending adjacent a side of the first component, said torsional vibration mode 210 entraining an axial movement of the side of the first component opposite an axial movement of the portion of the second component entrained by the axial vibration mode. Moreover, energy is transferred 230 from the torsional vibration mode to oppose energy from the axial vibration mode via a structure connecting the portion of the second component to the side of the first component.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the structure connecting the first component to the second component can optionally be provided with a damper for absorbing kinetic energy in the axial orientation. Yet further modifications could be implemented by a person of ordinary skill in the art in view of the present disclosure, which modifications would be within the scope of the present technology.

The invention claimed is:

1. A gas turbine engine comprising:
   a casing,
   a rotor rotatable around a rotation axis relative the casing, the casing extending along and around the rotation axis, an axial orientation defined parallel to the rotation axis, a vertical radial orientation defined normal to the axial orientation, the vertical radial orientation extending from a bottom to a top, and a horizontal radial orientation defined normal to both the axial orientation and to the vertical radial orientation, the horizontal radial orientation extending from a first side of the rotation axis to a second side of the rotation axis that is opposite the first side;
   a first component mounted externally to the casing by a first mount, the first mount defining a torsion axis extending along the vertical radial orientation, the first component having a center of gravity located on the first side of the torsion axis;
   a second component mounted externally to the casing on the second side, extending along the vertical radial orientation from a bottom portion of the second component to a top portion of the second component, a second mount connecting the bottom portion of the second component to the casing; and
   a structure connecting the top portion of the second component to at least one of the first component and the first mount, on the second side of the torsion axis;
   wherein the structure is more elastically flexible in the axial orientation than in the horizontal radial orientation, and has an end freely slidable along the vertical radial orientation.

2. The gas turbine engine of claim 1, wherein the structure is at least three times narrower in the axial orientation than in the vertical radial orientation.

3. The gas turbine engine of claim 1, wherein the second mount includes a second structure and a third structure axially spaced from one another.

4. The gas turbine engine of claim 3, wherein the third structure is slidable in the axial orientation and fixes displacements in the vertical radial orientation and in the horizontal radial orientation, and the second structure fixes all displacement.

5. The gas turbine engine of claim 1, wherein the structure is secured to at least one of the first component and the second component with at least one fastener extending across a clearance hole formed in the structure.

6. The gas turbine engine of claim 1, wherein the first component is an accessory gearbox connected to the at least one rotor via a driveshaft.

7. The gas turbine engine of claim 6, wherein the first mount includes at least three structures, the torsion axis coinciding with a rotation axis of the driveshaft.

8. The gas turbine engine of claim 6, wherein the accessory gearbox has an overhanging portion protruding on the first side of the first mount, the overhanging portion housing a bearing oil pump of the gas turbine engine.

9. The gas turbine engine of claim 1, wherein the second component is tall along the vertical radial orientation.

10. The gas turbine engine of claim 9, wherein the second component is an oil tank of the gas turbine engine.

11. The gas turbine engine of claim 1, wherein the gas turbine engine is a turboshaft engine.

12. An assembly comprising:
   a first component mounted externally to a supporting component by a first mount, the first mount defining a torsion axis, the first component having a center of gravity located on a first side relative the torsion axis;
   a second component mounted to the supporting component on a second side; and
   a structure extending between the second component and the first component on the second side relative the torsion axis;
   wherein the structure is more elastically flexible in an orientation circumferential to the torsion axis than in an orientation radial to the torsion axis, and has an end slidable relative one of the first component and the second component in an orientation parallel to the torsion axis.

13. The gas turbine engine of claim 8, wherein the structure is at least three times narrower in the orientation circumferential to the torsion axis than in the orientation parallel to the torsion axis.

* * * * *